J. K. MAYO.
PIPES, TUBES, FUNNELS, FAUCETS, &c.
No. 3,091. Reissued Aug. 18, 1868.
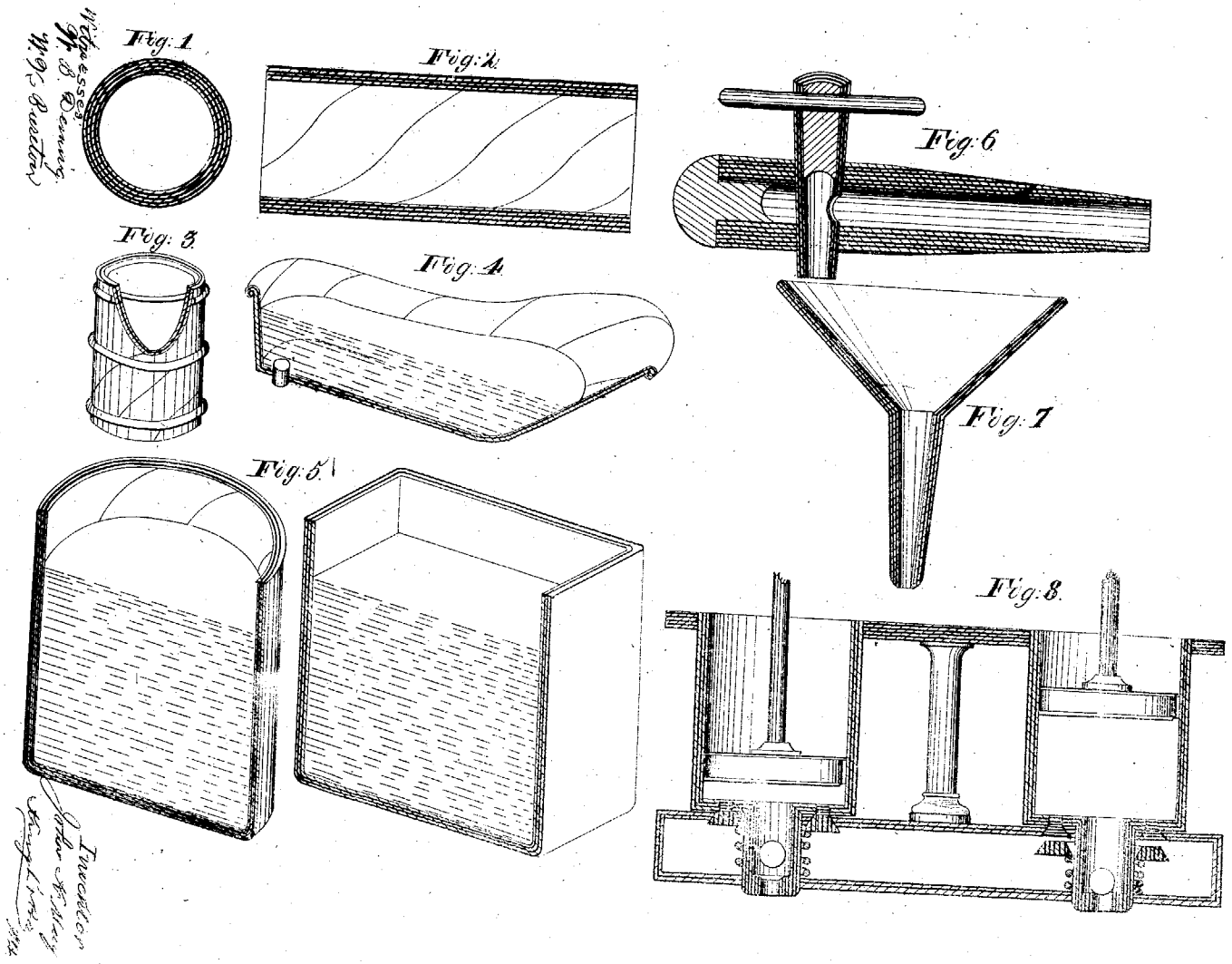

United States Patent Office.

JOHN K. MAYO, OF NEW YORK, N. Y., FOR HIMSELF, AND ANDRE CUSHING AND GEORGE B. CUSHING, OF ST. JOHN, NEW BRUNSWICK, ASSIGNEES OF JOHN K. MAYO.

*Letters Patent No.* 51,735, *dated December* 26, 1865; *reissue No.* 3,091, *dated August* 18, 1868.

DIVISION G.

IMPROVEMENT IN PIPES, TUBES, FUNNELS, FAUCETS, &c.

The Schedule referred to in these Letters Patent and making part of the same.

TO ALL WHOM IT MAY CONCERN:

Be it known that JOHN K. MAYO, formerly of Portland, Maine, but now of the city, county, and State of New York, invented a new and useful Improvement in Apparatus, Conductors, and Vessels for Hydraulic, Pneumatic, and Analogous Purposes; and the following is hereby declared to be a sufficiently full, clear, and exact description thereof to enable one skilled in the art to which the said invention appertains to carry it into effect, reference being had to the accompanying drawings, which are made a part of this specification.

The invention consists in constructing various descriptions of apparatus for transmitting or containing fluids, and other structures, of a number of thin sheets or scales of wood cemented or otherwise connected firmly together, with the grain of the several scales or thicknesses crossed or diversified so that they will afford to each other mutual support and protection against splitting, checking, expanding, or shrinking.

In the drawings—

Figure 1 is a transverse section of a water-pipe illustrating the invention.

Figure 2 is a longitudinal section of the same.

Figure 3 is a perspective view of a barrel.

Figure 4 is a sectional perspective view of a bathing-tub.

Figure 5 represents sections of tanks or cisterns square and round.

Figure 6 is a sectional view of a faucet or gate.

Figure 7 represents a vertical section of a funnel.

Figure 8 is an axial section of a cylindrical bellows.

In carrying out this invention, as applied to hollow vessels for containing or conducting fluids, or for any purposes, the several longitudinal and transverse scale-boards (with cement applied) are placed upon or within a mould, matrix, or form of proper shape. An internal or external form is then applied, to compress the material firmly together. When properly set, the article is removed, and may be painted, or varnished or covered with cement inside and out, or either, in any usual way; or the material may, in some instances, be built on to forms from the inside, outwardly.

Before moulding and connecting the scale-boards or laminæ, they may, when necessary, be subjected to the action of steam, heat, or moisture, to render them more pliable.

The invention is applicable to the manufacture of conducting-pipes and conduits of all kinds, with sleeve, faucet, or flange-joints, mill and factory-flumes, drains, sewers, water-pipes, well-tubes, faucets, funnels, filters, basins, tubs, pails, firkins, kegs, barrels, measures, cans, air-cylinders, blowers, bellows, canteens, pneumatic gas-machines, gasometers, tunnels, pneumatic tubes, ventilators, cisterns, tanks, and a great variety of articles for conducting or containing liquids or other articles.

The following is what is desired to be secured by Letters Patent as the invention of the said JOHN K. MAYO:

A conductor or vessel made of thin scale-boards or laminæ, of wood cemented together, with the grain crossed or diversified, substantially as and for the purpose herein set forth.

JOHN K. MAYO.

Witnesses:

EDWARD WILLARD,

S. W. FROST.